US012689539B2

(12) United States Patent
Hahn et al.

(10) Patent No.: US 12,689,539 B2
(45) Date of Patent: Jul. 21, 2026

(54) HOUSEHOLD APPLIANCES CONNECTION MANAGEMENT

(71) Applicant: Haier US Appliance Solutions, Inc., Wilmington, DE (US)

(72) Inventors: Janghwan Hahn, Louisville, KY (US); Anand Ashok Bora, Louisville, KY (US); Chad Michael Helms, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 398 days.

(21) Appl. No.: 18/357,042

(22) Filed: Jul. 21, 2023

(65) Prior Publication Data

US 2025/0030571 A1 Jan. 23, 2025

(51) Int. Cl.
H04L 12/28 (2006.01)

(52) U.S. Cl.
CPC .. H04L 12/2816 (2013.01); *H04L 2012/2841* (2013.01)

(58) Field of Classification Search
CPC ......... H04L 12/2816; H04L 2012/2841; H04L 12/28; H04L 12/2803; H04L 12/2807; H04L 12/2823; H04L 12/2827; H04L 12/2829; H04L 12/283; H04L 12/2838; H04L 2012/284; H04L 12/40143; H04L 12/40156; H04L 12/40163; H04L 47/10; H04L 47/24; H04L 47/50; H04L 47/6215; H04L 47/6275; H04L 47/6295; H04L 47/80; H04L 47/805; H04L 67/50; H04L 67/60; H04L 67/61
See application file for complete search history.

(56) References Cited

U.S. PATENT DOCUMENTS

| | | | | | |
|---|---|---|---|---|---|
| 5,461,704 | A | * | 10/1995 | Wakabayashi | B41J 29/38 |
| | | | | | 358/1.15 |
| 5,953,671 | A | * | 9/1999 | Childress | H04W 84/08 |
| | | | | | 455/512 |
| 6,295,284 | B1 | * | 9/2001 | Maggenti | H04W 84/08 |
| | | | | | 370/444 |
| 7,457,287 | B1 | * | 11/2008 | Shaffer | H04L 47/245 |
| | | | | | 370/389 |
| 7,853,207 | B2 | * | 12/2010 | Harada | H04M 1/72412 |
| | | | | | 455/418 |
| 8,051,381 | B2 | * | 11/2011 | Ebrom | H04L 69/26 |
| | | | | | 700/83 |
| 8,705,458 | B2 | * | 4/2014 | Hart | H04L 47/2441 |
| | | | | | 370/347 |

(Continued)

FOREIGN PATENT DOCUMENTS

| | | |
|---|---|---|
| CN | 113395690 A | 9/2021 |
| CN | 112911568 B | 12/2022 |
| JP | 5534348 B2 | 6/2014 |

*Primary Examiner* — Yuwen Pan
*Assistant Examiner* — Samuel H. Leonard
(74) *Attorney, Agent, or Firm* — Dority & Manning, P.A.

(57) ABSTRACT

A household appliance includes a controller and a communication module. A method of operating the household appliance includes receiving a connection request from a first device and receiving a connection request from a second device. The method also includes looking up a connection priority database. The method further includes connecting to only one of the first device and the second device based on the connection priority database.

14 Claims, 5 Drawing Sheets

500

Receive A Connection Request From A First Device — 510

Receive A Connection Request From A Second Device — 520

Look Up A Connection Priority Database — 530

Connect To Only One Of The First Device And Second Device Based On The Connection Priority Database — 540

(56)         References Cited

U.S. PATENT DOCUMENTS

| | | | |
|---|---|---|---|
| 8,816,828 B2 * | 8/2014 | Ebrom | H04L 67/12 |
| | | | 340/12.23 |
| 9,485,801 B1 * | 11/2016 | Probasco | H04L 67/60 |
| 9,948,643 B2 * | 4/2018 | Yamamoto | H04L 63/102 |
| 9,977,547 B1 * | 5/2018 | Sloo | G06K 19/08 |
| 11,563,631 B2 * | 1/2023 | Hu | H04L 41/0806 |
| 2005/0032535 A1 * | 2/2005 | Shitama | H04W 48/16 |
| | | | 455/512 |
| 2006/0133418 A1 * | 6/2006 | Anand | H04L 47/805 |
| | | | 370/468 |
| 2006/0136574 A1 * | 6/2006 | Anand | H04L 67/61 |
| | | | 709/219 |
| 2008/0105134 A1 * | 5/2008 | Elston, III | G06Q 10/06 |
| | | | 99/325 |
| 2014/0369190 A1 * | 12/2014 | Chan | H04L 47/24 |
| | | | 370/230 |
| 2015/0149524 A1 * | 5/2015 | Nishikawa | H04L 12/2803 |
| | | | 709/201 |
| 2015/0350031 A1 * | 12/2015 | Burks | G06F 3/04842 |
| | | | 715/736 |
| 2016/0219496 A1 * | 7/2016 | Jang | H04W 12/06 |
| 2017/0004828 A1 * | 1/2017 | Lee | G06F 3/167 |
| 2019/0090158 A1 * | 3/2019 | Das | H04L 67/12 |
| 2019/0109723 A1 * | 4/2019 | Ebrom | H05B 6/688 |
| 2020/0106635 A1 * | 4/2020 | Yoon | H04L 12/282 |
| 2023/0276991 A1 * | 9/2023 | Beckmann | A47J 43/046 |
| | | | 241/282.2 |
| 2023/0280205 A1 * | 9/2023 | Beckmann | G01G 23/16 |
| | | | 177/1 |
| 2023/0281146 A1 * | 9/2023 | Beckmann | G06F 13/4068 |
| | | | 710/305 |
| 2024/0089799 A1 * | 3/2024 | Shahab-Masood | H04L 65/80 |

* cited by examiner

HOUSEHOLD APPLIANCES CONNECTION MANAGEMENT

FIELD OF THE INVENTION

The present subject matter relates generally to household appliances which can wirelessly connect to other devices such as accessories, peripherals, or any other suitable devices. In particular, the present subject matter relates to systems and methods for managing and prioritizing multiple wireless connections for a household appliance.

BACKGROUND OF THE INVENTION

Household appliances are utilized generally for a variety of tasks by a variety of users. For example, a household may include such appliances as laundry appliances, e.g., a washer and/or dryer, kitchen appliances, e.g., a refrigerator, a microwave, and/or a coffee maker, along with room air conditioners and other various appliances.

Some household appliances can also include features for connecting to and communicating with various other devices wirelessly. Such communication may provide connected features on the household appliances, e.g., where the household appliance communicates with other devices such as a personal device, e.g., smartphone, smart home systems, remote sensors and/or other household appliances.

Such household appliances may have limited capacity, e.g., limited bandwidth available, for connecting to and communicating with such other devices. In some instances, a desired device may not be able to connect, or may have difficulty connecting, to the household appliance when too many other devices are competing for the limited network resources or communication resources, e.g., limited bandwidth, of the household appliance.

Accordingly, there exists a need for systems and methods which permit prioritizing wireless connections for household appliances and efficiently using limited resources of the household appliance in an easier and more convenient manner.

BRIEF DESCRIPTION OF THE INVENTION

Aspects and advantages of the invention will be set forth in part in the following description, or may be obvious from the description, or may be learned through practice of the invention.

In accordance with one exemplary embodiment of the present disclosure, a method of operating a household appliance is provided. The household appliance includes a controller and a communication module. The method includes receiving a connection request from a first device and receiving a connection request from a second device. The method also includes looking up a connection priority database. The method further includes connecting to only one of the first device and the second device based on the connection priority database.

In accordance with another exemplary embodiment of the present disclosure, a household appliance is provided. The household appliance includes a controller and a communication module. The controller is configured for receiving a connection request from a first device and receiving a connection request from a second device. The controller is also configured for looking up a connection priority database. The controller is further configured for connecting to only one of the first device and the second device based on the connection priority database.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
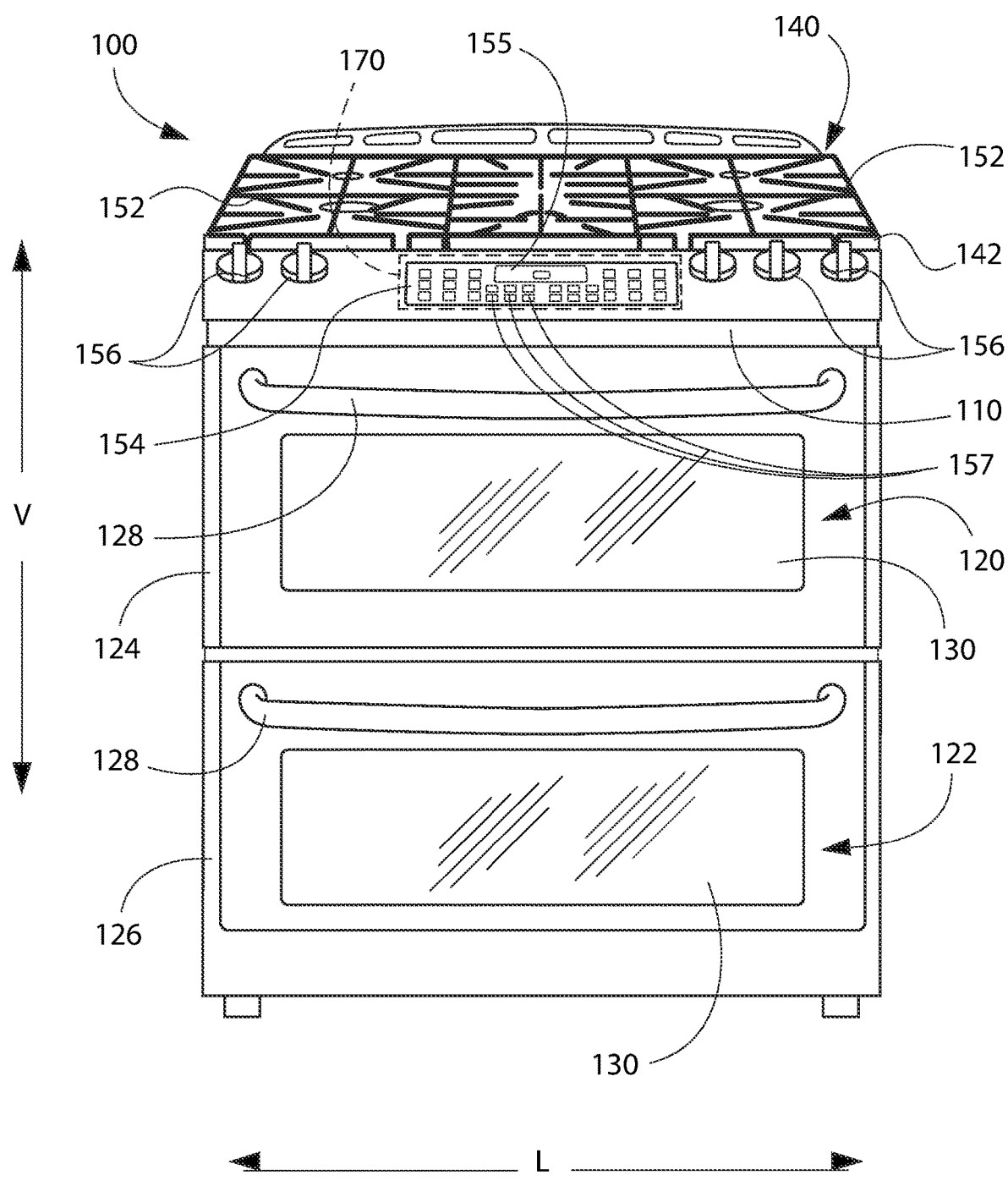
FIG. 1 provides a front, perspective view of an exemplary household appliance according to one or more example embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counterclockwise. As used herein, numerical terms such as "first," "second," "third," "primary," "secondary," "tertiary," etc., may be used interchangeably to distinguish one component from another and are not intended to signify location or importance of the individual components. Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

The present disclosure is generally directed to household appliances and methods of operating such appliances. It should be understood that "household appliances" and/or "appliances" are used herein to describe appliances typically used or intended for common domestic tasks, such as laundry appliances or kitchen appliances, e.g., as illustrated in FIG. 1 through 4, or air conditioners, dishwashing appliances, water heaters, etc., and any other household appliance which performs similar functions in addition to network communication and data processing. Thus, devices such as a personal computer, router, and other similar devices whose primary functions are network communication and/or data processing are not considered household appliances as used herein.

Figure 2:
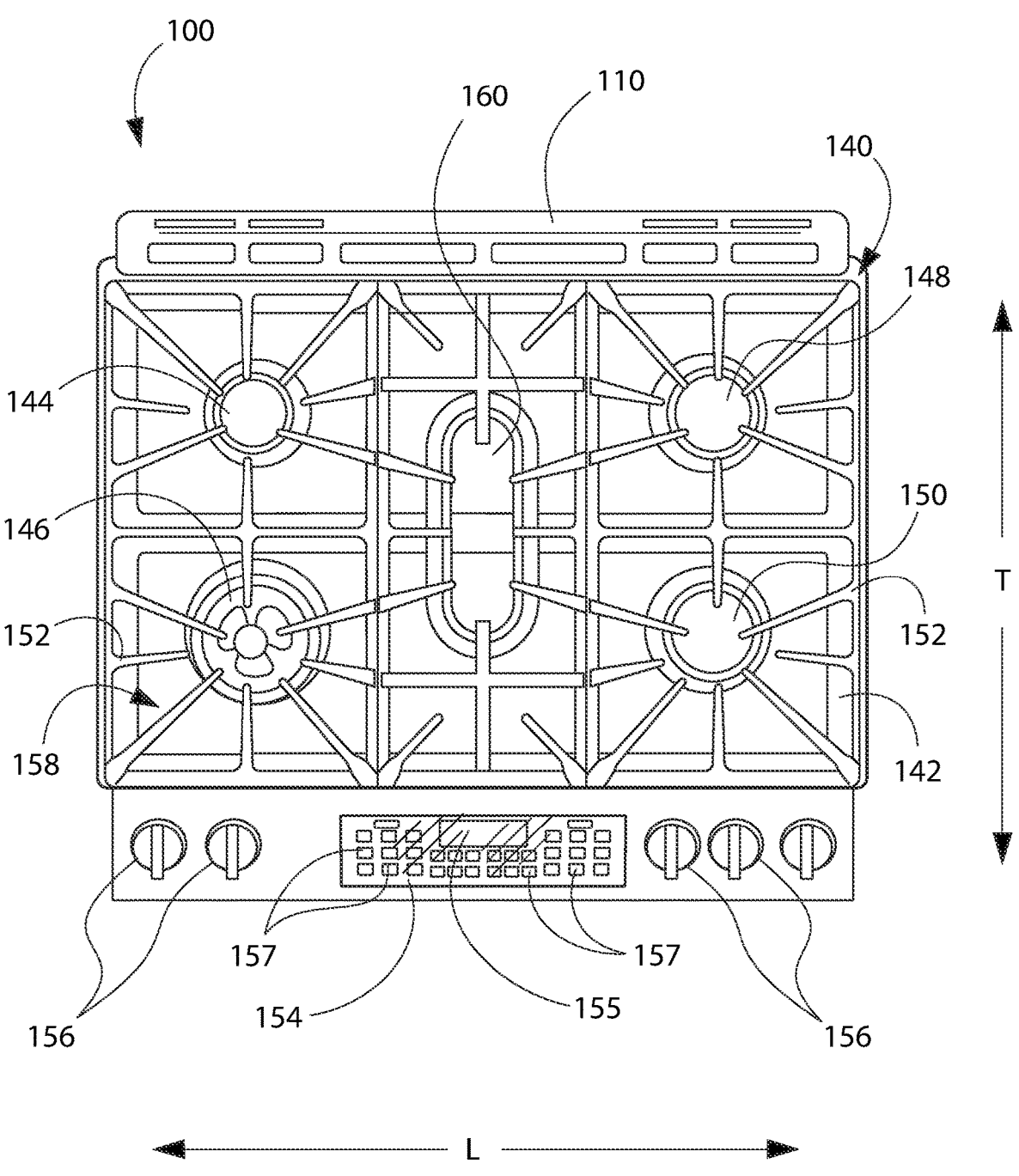
FIG. 2 provides a top, plan view of the example appliance of FIG. 1.
Figure 4:
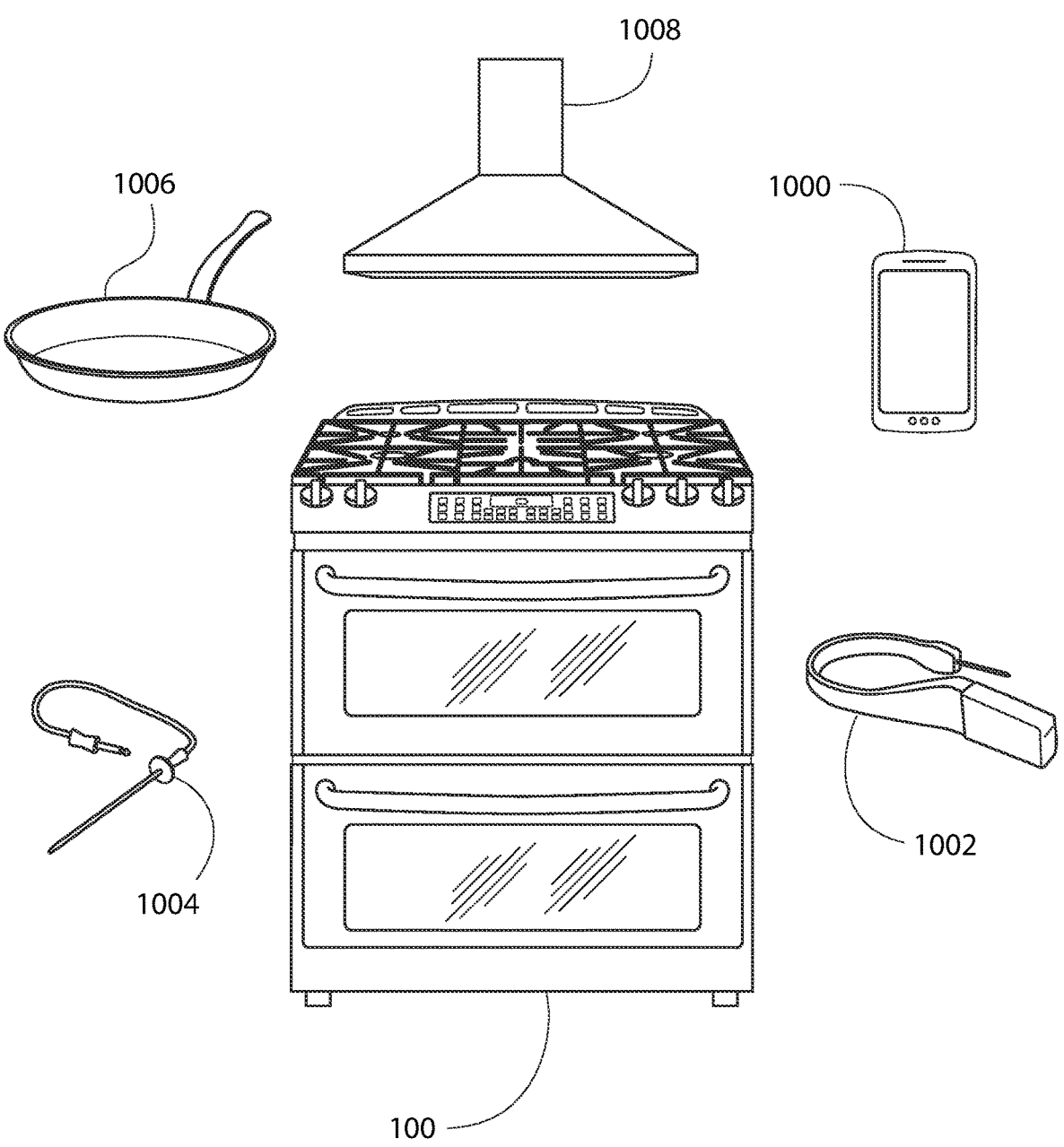
FIG. 4 provides an illustration of a household appliance and multiple devices which may wirelessly connect to the household appliance according to one or more exemplary embodiments of the present subject matter.

A household appliance according to embodiments of the present disclosure may be, for example, a cooktop appliance 100, e.g., as illustrated in FIGS. 1, 2, and 4. FIG. 1 provides a front, perspective view of the cooktop appliance 100. FIG. 2 provides a top, plan view of cooktop appliance 100. As illustrated in FIGS. 1 and 2, the example cooktop appliance 100 includes an insulated cabinet 110. Cabinet 110 defines an upper cooking chamber 120 and a lower cooking chamber 122. Thus, this particular exemplary cooktop appliance 100 is generally referred to as a double oven range appliance. As will be understood by those skilled in the art, the illustrated range appliance is an embodiment of a cooktop appliance and is provided by way of example only, and the present subject matter may be used in any suitable cooktop appliance, e.g., a single oven range appliance or a standalone cooktop appliance. In other exemplary embodiments of the present disclosure, the cooktop appliance may include a single cooking chamber, or no cooking chamber at all, such as a standalone cooktop appliance, e.g., which may be built in to a countertop. Thus, the example embodiment shown in FIG. 1 is not intended to limit the present subject matter to any particular cooking chamber configuration or arrangement (or even the presence of a cooking chamber at all, e.g., as in the case of a standalone cooktop appliance).

Upper and lower cooking chambers 120 and 122 are configured for the receipt of one or more food items to be cooked. Cooktop appliance 100 includes an upper door 124 and a lower door 126 rotatably attached to cabinet 110 in order to permit selective access to upper cooking chamber 120 and lower cooking chamber 122, respectively. Handles 128 are mounted to upper and lower doors 124 and 126 to assist a user with opening and closing doors 124 and 126 in order to access cooking chambers 120 and 122. As an example, a user can pull on handle 128 mounted to upper door 124 to open or close upper door 124 and access upper cooking chamber 120. Glass window panes 130 provide for viewing the contents of upper and lower cooking chambers 120 and 122 when doors 124 and 126 are closed and also assist with insulating upper and lower cooking chambers 120 and 122. Heating elements (not shown), such as electric resistance heating elements, gas burners, microwave heating elements, halogen heating elements, or suitable combinations thereof, are positioned within upper cooking chamber 120 and lower cooking chamber 122 for heating upper cooking chamber 120 and lower cooking chamber 122.

Cooktop appliance 100 also includes a cooktop 140. Cooktop 140 is positioned at or adjacent to a top portion of cabinet 110. Thus, cooktop 140 is positioned above upper and lower cooking chambers 120 and 122. Cooktop 140 includes a top panel 142. By way of example, top panel 142 may be constructed of glass, ceramics, enameled steel, and combinations thereof.

For cooktop appliance 100, a utensil holding food and/or cooking liquids (e.g., oil, water, etc.) may be placed onto grates 152 at a location of any of burner assemblies 144, 146, 148, 150, and/or 160. Burner assemblies 144, 146, 148, 150, 160 provide thermal energy to cooking utensils on grates 152. As shown in FIG. 2, burner assemblies 144, 146, 148, 150 and 160 can be configured in various sizes so as to provide e.g., for the receipt of cooking utensils (i.e., pots, pans, griddle, etc.) of various sizes and configurations and to provide different heat inputs for such cooking utensils. Grates 152 are supported on a cooking surface, e.g., top surface 158 of top panel 142. Cooktop appliance 100 includes various burner assemblies, e.g., circular burner assemblies 144, 146, 148, and 150, and also includes an elongated griddle burner 160 positioned at a middle portion of top panel 142, as may be seen in FIG. 2. A griddle may be positioned on grates 152 and heated with griddle burner 160.

A user interface panel 154 is located within convenient reach of a user of the cooktop appliance 100. For this example embodiment, cooktop appliance 100 also includes knobs 156 that are each associated with one of burner assemblies 144, 146, 148, 150 and griddle burner 160. Knobs 156 allow the user to activate each burner assembly and determine the amount of heat input provided by each burner assembly 144, 146, 148, 150 and griddle burner assembly 160 to a cooking utensil located thereon. The user interface panel 154 may also include one or more inputs 157, such as buttons or a touch pad or touchscreen, for selecting or adjusting operation of the cooktop appliance 100, such as for selecting or initiating a cooking mode. User interface panel 154 may also be provided with one or more graphical display devices 155 that deliver certain information to the user such as e.g., whether a particular burner assembly is activated and/or the temperature at which the burner assembly is set.

Although shown with knobs 156, it should be understood that knobs 156 and the configuration of cooktop appliance 100 shown in FIG. 1 is provided by way of example only. More specifically, cooktop appliance 100 may include various input components, such as one or more of a variety of touch-type controls, electrical, mechanical or electro-mechanical input devices including rotary dials, push buttons, touch pads and/or a touchscreen (e.g., the touchscreen may provide both the display 155 and inputs 157). The user interface panel 154 may include other display components, such as a digital or analog display device 155, designed to provide operational feedback to a user.

As may be seen in FIG. 1, cooktop appliance 100 may include a processing device or controller 170 and the operation of cooktop appliance 100 may be controlled by the controller 170. Controller 170 may be communicatively coupled with a control panel or user interface panel 154 as well as the display 155 and user inputs 157. Controller 170 may also be communicatively coupled with various operational components of cooktop appliance 100 as well, such as burner assemblies 144, 146, 148, 150 and 160, knobs 156, temperature sensors, cameras, speakers, and microphones, etc. Input/output ("I/O") signals may be routed between controller 170 and the various operational components of cooktop appliance 100. Thus, controller 170 can selectively activate and operate these various components. Various components of cooktop appliance 100 are communicatively coupled with controller 170 via one or more communication lines, such as, e.g., signal lines, shared communication busses, or wirelessly.

Controller 170 includes one or more memory devices and one or more processors (not labeled). The processors can be any combination of general or special purpose processors, CPUs, or the like that can execute programming instructions or control code associated with operation of cooktop appliance 100. The memory devices may represent random access memory such as DRAM or read only memory such as ROM or FLASH. In one embodiment, the processor executes programming instructions stored in memory. The memory may be a separate component from the processor or may be included onboard within the processor. Alternatively, controller 170 may be constructed without using a processor, e.g., using a combination of discrete analog and/or digital logic circuitry (such as switches, amplifiers, integrators, comparators, flip-flops, AND gates, and the like) to perform control functionality instead of relying upon software. Controller 170 may include a network interface such that controller 170 can connect to and communicate over one or more networks with one or more network nodes. Controller 170 can also include one or more transmitting, receiving, and/or transceiving components for transmitting/receiving communications with other devices communicatively coupled with cooktop appliance 100. Additionally or alternatively, one or more transmitting, receiving, and/or transceiving components can be located off board controller 170. Controller 170 can be positioned in a variety of locations throughout cooktop appliance 100. For this embodiment, controller 170 is located proximate user interface panel 154 toward the top portion of cooktop appliance 100.

As noted above, the configuration of cooktop appliance 100 illustrated in FIGS. 1 and 2 is by way of example only, and aspects of the present disclosure may also be used with other cooking appliances, such as cooktop appliances, wall ovens, or various other oven appliances having different heating elements, such as gas burners on the cooktop and/or other heating elements, such as electric burners on the cooktop, e.g., resistance heating elements, induction heating elements, etc., as well as variations in the number or size of burners, or variations in the location, position, or type of controls on the user interface, among numerous other possible variations in the configuration of the cooktop appliance 100 within the scope of the present disclosure.

Using the teachings disclosed herein, one of skill in the art will understand that the present subject matter can be used with other types of cooktop appliances, e.g., as described above. Accordingly, other configurations of cooktop appliance 100 could be provided, it being understood that the configurations shown in the accompanying FIGS. and the description set forth herein are by way of example for illustrative purposes only.

Furthermore, the household appliance of the present disclosure is not limited to a cooktop appliance at all, and may also be any other suitable household appliance which connects wirelessly to multiple devices. For example, the household appliance may be a laundry appliance, such as a washing machine appliance, and may communicate with and connect to selected devices such as a dryer appliance, one or more leak sensors, a water softener or other water treatment appliance, and/or a water heater. As another example, the household appliance may be a refrigerator appliance and may selectively connect to small appliances, such as a coffee maker or standalone ice maker. In such embodiments, the refrigerator may communicate with the small appliances in order to automatically supply a needed fill amount of water for the small appliance, such as a water dispenser of the refrigerator may automatically dispense the needed fill amount. Also in embodiments where the household appliance is a refrigerator appliance, the refrigerator appliance may be in communication with additional devices such as one or more leak sensors.

According to various embodiments of the present disclosure, the household appliance 100 may take the form of any of the examples described above, or may be any other household appliance. Thus, it will be understood that the present subject matter is not limited to any particular household appliance.

Figure 3:
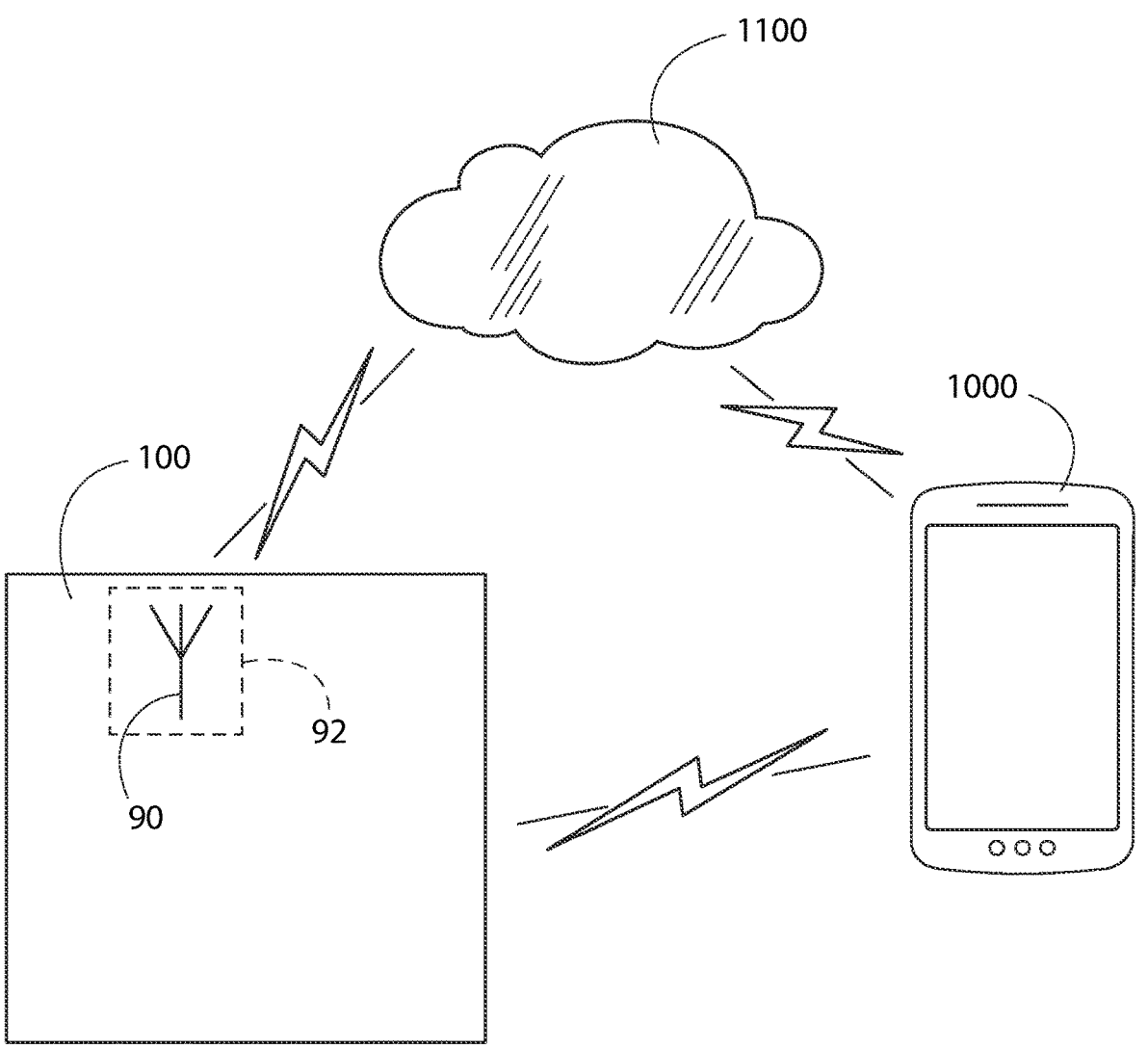
FIG. 3 provides a diagrammatic illustration of a household appliance in communication with a remote computing device and with a remote user interface device according to one or more exemplary embodiments of the present subject matter.

Turning now to FIG. 3, a general schematic is provided of a household appliance 100, which communicates wirelessly with a remote user interface device 1000 and a network 1100. As noted above, the cooktop appliance 100 described with reference to FIGS. 1 and 2 is an example embodiment of the household appliance 100. As illustrated in FIG. 3, the household appliance 100 may include an antenna 90 by which the household appliance 100 communicates with, e.g., sends and receives signals to and from, the remote user interface device 1000. The antenna 90 may be part of, e.g., onboard, a communications module 92. The communications module 92 may be a wireless communications module operable to connect wirelessly, e.g., over the air, to one or more other devices via any suitable wireless communication protocol. For example, the communications module 92 may be a WI-FI® module, a BLUETOOTH® module, or a combination module providing both WI-FI® and BLUETOOTH® connectivity, e.g., the combination module may be a dual-radio chipset. The remote user interface device 1000 may be a laptop computer, smartphone, tablet, personal computer, wearable device, smart home system, and/or various other suitable devices.

The household appliance 100 may be in communication with the remote user interface device 1000 device through various possible communication connections and interfaces. The household appliance 100 and the remote user interface device 1000 may be matched in wireless communication, e.g., connected to the same wireless network. The household appliance 100 may communicate with the remote user interface device 1000 via short-range radio such as BLUETOOTH® or any other suitable wireless network having a layer protocol architecture. As used herein, "short-range" may include ranges less than about ten meters and up to about one hundred meters. For example, the wireless network may be adapted for short-wavelength ultra-high frequency (UHF) communications in a band between 2.4 GHz and 2.485 GHz (e.g., according to the IEEE 802.15.1 standard). In particular, BLUETOOTH® Low Energy, e.g., BLUETOOTH® Version 4.0 or higher, may advantageously provide short-range wireless communication between the household appliance 100 and the remote user interface device 1000. For example, BLUETOOTH® Low Energy may advantageously minimize the power consumed by the exemplary methods and devices described herein due to the low power networking protocol of BLUETOOTH® Low Energy.

The remote user interface device 1000 is "remote" at least in that it is spaced apart from and not physically connected to the household appliance 100, e.g., the remote user interface device 1000 is a separate, stand-alone device from the household appliance 100 which communicates with the household appliance 100 wirelessly. Any suitable device separate from the household appliance 100 that is configured to provide and/or receive communications, information, data, or commands from a user may serve as the remote user interface device 1000, such as a smartphone (e.g., as illustrated in FIG. 4), smart watch, personal computer, smart home system, or other similar device. For example, the remote user interface device 1000 may be a smartphone operable to store and run applications, also known as "apps," and some or all of the method steps disclosed herein may be performed by a smartphone app.

The remote user interface device 1000 may include a memory for storing and retrieving programming instructions. Thus, the remote user interface device 1000 may provide a remote user interface which may be an additional user interface to the user interface panel 154. For example, the remote user interface device 1000 may be a smartphone operable to store and run applications, also known as "apps," and the additional user interface may be provided as a smartphone app.

As mentioned above, the household appliance 100 may also be configured to communicate wirelessly with a network 1100. The network 1100 may be, e.g., a distributed computing and data storage system including one or more remote computing devices such as remote databases and/or remote servers, which may be collectively referred to as "the cloud." In additional embodiments, the network 1100 may include any suitable distributed computing environment, such as the fog or the edge. In some embodiments, the network 1100 may only provide remote data storage and computing tasks or processes may be performed locally, e.g., by the controller 170 alone. For example, the household appliance 100 may communicate with the network 1100 over the Internet, which the household appliance 100 may access via WI-FI®, such as from a WI-FI® access point in a user's home.

In addition to the remote user interface device 1000, the household appliance 100 may also connect to, or be operable to connect wirelessly to, one or more other devices such as accessories, peripherals, or other appliances. An exemplary group of devices 1000, 1002, 1004, 1006, and 1008 (of which the remote user interface 1000 is one exemplary device) which may connect to or attempt to connect to the household appliance is illustrated in FIG. 4. As shown in FIG. 4, the cooktop appliance 100 is again illustrated as an example household appliance 100. In the same manner described above with respect to the remote user interface device 1000, which is one particular example device of the multiple devices, the household appliance 100 may be in communication with each of the devices through various possible communication connections and interfaces. For example, the household appliance 100 may communicate with the devices via short-range radio such as BLUETOOTH® or any other suitable wireless network having a layer protocol architecture. The household appliance 100 may, however, connect to and communicate with less than all of the devices at any one time, such as the household appliance 100 may connect to only selected devices of the multiple devices at one time, for example, the selected devices may be one or more higher priority devices of the multiple devices.

A first probe device 1002 is illustrated in FIG. 4. The first probe device 1002 may be configured to attach to a cooking utensil while the cooking utensil is on the cooktop and may include a temperature probe which monitors a temperature of contents of the cooking utensil. For example, the first probe device 1002 may be configured for use in a special cooking mode, such as a sous vide mode. A second probe device 1004 is also illustrated in FIG. 4. The second probe device 1004 may be configured for use inside one of the oven chambers, such as during a bake operation or broil operation. A smart utensil device 1006 is further illustrated in FIG. 4. The smart utensil device 1006 may include a built-in temperature sensor and may wirelessly communicate temperature data to the cooktop appliance 100 when the smart utensil device 1006 is connected during a cooktop cooking operation. Also illustrated in FIG. 4 is a vent hood device 1008, which may connect to the cooktop appliance 100 to provide convenience features such as synchronizing time displayed on the cooktop appliance 100 and on the vent hood device 1008, automatically turning on a fan or light in the vent hood device 1008 when the cooktop, e.g., one or more of the cooktop heating elements, is activated.

As will be described further below, the household appliance 100, e.g., cooktop appliance 100, may be operable to determine a priority level for one or more devices of the multiple devices and connecting to the higher priority device(s) rather than lower priority devices. For example, determining a priority level may include determining a priority tier for each of the multiple devices, and connecting to devices in higher tiers before or instead of lower tiers. The remote user interface device 1000 may have the highest priority when the remote user interface device 1000 is used to control, operate, and/or commission the household appliance 100. Thus, the remote user interface device 1000 may be in the highest priority tier and may be the only device in the highest priority tier. The first and second probe devices 1002 and 1004 may be in the same tier, and the smart utensil device 1006 may also be in the same tier, which may be a middle tier. The vent hood device 1008 may be the lowest priority tier, e.g., where the vent hood device 1008 provides convenience features which are not directly related to the core operations (e.g., cooking) of the cooktop appliance 100.

Devices which are in the same tier may be selected for connection to the household appliance 100, e.g., may be given priority, over other devices in the same tier or priority level when an urgent flag is set for the device. For example, the first probe device 1002 may have an urgent flag when advertising for a wireless (e.g., BLUETOOTH®) connection if a button on the first probe device 1002 has been pressed, such as by a user, which may indicate the user's intention to employ the first probe device 1002 for cooking. In such cases, the cooktop appliance 100 may check if the special cooking mode, e.g., sous vide mode, has been turned on before accepting the urgent flag and prioritizing the first probe device 1002 connection. As another example, when the second probe device 1004 is advertising for a wireless connection, an urgent flag for the second probe device 1004 may be set when a button on the second probe device 1004 has been pressed, e.g., similar to the first probe device 1002 as described above. The cooktop appliance 100 may check if an oven cooking operation, e.g., bake or broil, has been initiated before accepting the urgent flag and prioritizing the second probe device 1004 connection. The smart utensil device 1006 may also be usable in a special cooking mode, or in any cooktop operation. Thus, an urgent flag for the smart utensil device 1006 may be set when the handle of the smart utensil device 1006 is tapped by a user. In such cases, the cooktop appliance 100 may then check if a corresponding special cooking mode is activated or if one or more of the cooktop heating elements, e.g., burners, is turned on, before accepting the urgent flag and prioritizing the smart utensil device 1006 connection.

For example, if the cooktop appliance 100 has a connection limit of one, e.g., may connect to only one BLUETOOTH® device at a time, while the first probe device 1002, second probe device 1004, and smart utensil device 1006 are all advertising to be connected, and only the second probe device 1004 has set an urgent flag, the cooktop appliance 100 may connect to the second probe device 1004 only. In another example, when more than one of the first probe device 1002, second probe device 1004, and smart utensil device 1006 has set an urgent flag, the cooktop appliance 100 may only accept the urgent flag for the device which is most likely to be in use, e.g., based on which cooking mode or operation is activated, as described above.

Now that the construction and configuration of household appliance 100 have been presented according to an exemplary embodiment of the present subject matter, exemplary methods for operating a household appliance 100, such as a laundry appliance, oven appliance, dishwasher appliance, or other household appliance, are provided. In this regard a controller, for example, controller 170, of the household appliance may be configured for implementing some or all steps of one or more of the following exemplary methods. However, it should be appreciated that the exemplary methods are discussed herein only to describe exemplary aspects of the present subject matter, and are not intended to be limiting.

Figure 5:
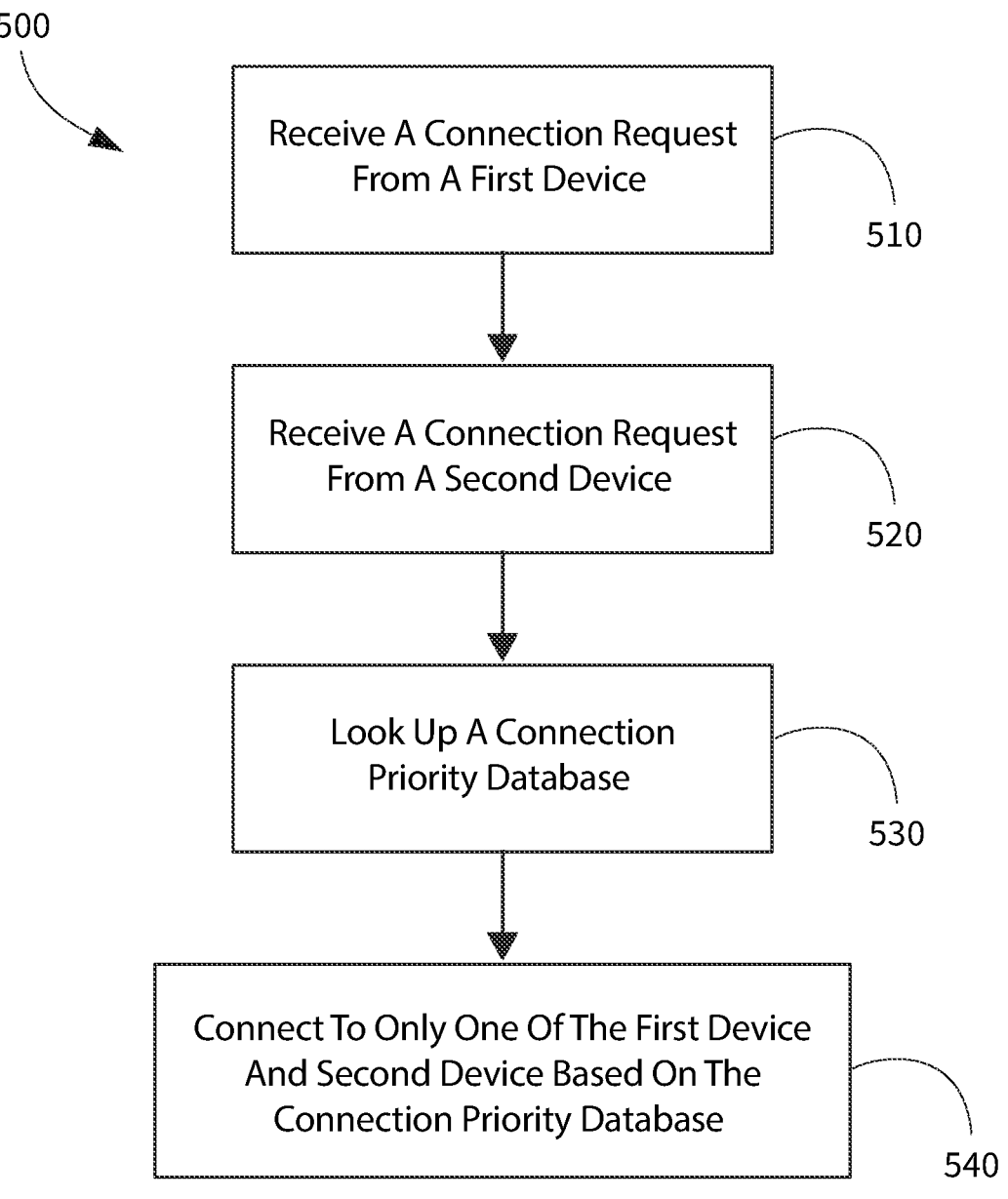
FIG. 5 provides a flowchart illustrating an example method of operating a household appliance according to one or more example embodiments of the present disclosure.

An exemplary method 500 of operating a household appliance is illustrated in FIG. 5. Such methods according to various embodiments of the present disclosure may include receiving a connection request from a first device, e.g., as indicated at 510 in FIG. 5, and receiving a connection request from a second device, e.g., as indicated at 520 in FIG. 5. The first and second devices may be, for example, any two of the exemplary devices described above with reference to FIG. 4. For example, the connection request from the first device may be a first short-range radio connection request and the connection request from the second device may be a second short-range radio connection request, such as both devices may be BLUETOOTH® devices and both connection requests may be BLUETOOTH® connection requests or BLUETOOTH® advertisements. In some embodiments, the household appliance 100 may be connected to additional devices prior to the connection requests from the first and second devices, and the first and second devices may be competing for the last available connection. In some embodiments, the connection limit may be one, such that the household appliance 100 may only connect to one of the first device or the second device without any other devices connected.

Referring again to FIG. 5, exemplary methods according to the present disclosure such as method 500 may also include looking up a connection priority database, e.g., as indicated at 530 in FIG. 5. The connection priority database may be or include a table with multiple connectable devices listed therein. The connection priority database may include tiers of devices and priority for connection to the household appliance may be determined, at least in part, by the tier in which devices are assigned in the connection priority database. Looking up the connection priority database may include connecting, by the controller of the household appliance using the communication module, to a remote computing device, such as in the cloud, and downloading or otherwise obtaining or accessing the connection priority database from the remote computing device.

Still with reference to FIG. 5, method 500 may also include connecting to only one of the first device and the second device based on the connection priority database. In some embodiments, the one of the first device and the second device may be the only device with which the household appliance wirelessly connects, or may be one of multiple connected devices, although the other of the first device and the second device may not be connected. Also, the household appliance may include a general communication module which is capable of connecting to any wireless device, e.g., any BLUETOOTH® device. The connection priority device may only include accessory devices which interoperate with the household appliance, e.g., for the exemplary cooktop appliance, only devices which provide a service or feature specific to the cooktop appliance, such as the probes or smart utensil which are usable within one or more cooking cycles or cooking features of the cooktop appliance. Accordingly, in some embodiments, one of the first device and the second device may be included in the connection priority database whereas the other of the first device and the second device may not be included in the connection priority database. Thus, in such embodiments, the one of the first device and the second device to which the household appliance connects may be the one that is included in the connection priority database. For example, when the connection priority database includes priority ratings, any device not found in the connection priority database will be treated as having an effective priority rating of zero.

In some embodiments, the connection priority database may include a plurality of tiers with at least one device in each tier. In such embodiments, each tier of the plurality of tiers may include a priority rating. For example, in embodiments where the household appliance is a cooktop appliance such as the exemplary cooktop appliance and associated connectable devices illustrated in FIG. 4, the connection priority database may include three or more tiers, such as a Tier A, Tier B, and Tier C. For example, the vent hood device 1008 may be in Tier A, the remote user interface device 1000 may be in Tier B, and one or both of the first probe device 1002 and the second probe device 1004 may be in Tier C. Such embodiments may further include determining a first tier of the first device in the connection priority database, determining a second tier of the second device in the connection priority database, and, in such embodiments, connecting to only one of the first device and the second device based on the connection priority database may include connecting to only one of the first device and the second device based on the priority rating of the first tier and the priority rating of the second tier. Returning to the cooktop appliance example, the tier including the remote user interface device 1000 may have a highest priority rating, such as a rating of five, the tier including one or both of the probe devices 1002 and 1004 may have a medium priority rating, such as a rating of three, and the tier including the vent hood device 1008 may have a lowest priority rating, such as a rating of one. In additional embodiments, more than three tiers may be included in the connection priority database, or only two tiers may be included. In some embodiments, each device may have its own tier, e.g., only one device per tier, or multiple devices which provide similar functions may have the same tier. For example, when one of the first device and the second device is the remote user interface device 1000 (or other device which provides similar features or functions and which is thus in the same tier as the remote user interface device 1000), and the other of the first device and the second device is in any other tier, where the tier including the remote user interface device 1000, e.g., Tier B as in the above example, has the highest priority rating, then connecting to only one of the first device and the second device based on the connection priority database may include connecting to the remote user interface device 1000 based on the connection priority database. As a more general example, whenever the first device and the second device are in different tiers in the connection priority database with different priority ratings, connecting to only one of the first device and the second device based on the connection priority database may include connecting to the device which is in the tier with the higher priority rating.

In some embodiments where the connection priority database includes a plurality of tiers with at least one device in each tier, each tier of the plurality of tiers may include a service or feature provided by the at least one device in the respective tier. For example, the priority rating for each tier may correspond to the service or feature provided by devices in the tier. Referring again to the example cooktop appliance and associated devices, the tier which includes the vent hood device 1008 may be associated in the connection priority database table with services or features such as synchronizing time displays, and synchronizing operation of the fan or light of the vent hood device 1008 with operation of cooktop heating elements of the cooktop appliance. The tier which includes the second probe device 1004 (oven probe) may be associated in the connection priority database table with services or features such as oven cook with temperature sensing features. The tier which includes the first probe device 1002 (e.g., sous vide probe) may be associated in the connection priority database table with services or features such as special cooking mode, e.g., sous vide cooking. The tier which includes the smart utensil device 1006 may be associated in the connection priority database table with services or features such as cooktop cooking with temperature sensing, e.g., more accurate cooking. The tier which includes the remote user interface device 1000 may be associated in the connection priority database table with services or features such as WI-FI® commissioning of the household appliance. The priority rating may correspond to the service or feature provided by devices in each tier in that higher priority ratings are assigned to services or features which are directly related to or include core features of the household appliance, e.g., cooking operations and heating element settings in the exemplary embodiments where the household appliance is a cooktop appliance. Where commissioning the household appliance, e.g., using the remote user interface device, may include providing an additional user interface for control of the household appliance, such services may be considered as related to all functions of the household appliance, because all functions may be selected or controlled via the remote user interface on the remote user interface device 1000. Accordingly, the commissioning service or feature may be assigned the highest priority.

As discussed above, when the first device and the second device are in different tiers with different priority ratings, connecting to only one of the first device and the second device based on the connection priority database may include connecting to the one of the first device and the second device which has the higher priority rating. In other cases, however, the first device and the second device may be in the same tier or may be in different tiers with the same priority rating. In such cases, the priority may be determined based on an urgent flag or signal strength. Thus, exemplary methods according to the present disclosure may also include determining an urgent flag of one of the first device and the second device and connecting to the device with the urgent flag. For example, when the urgent flag of the first device is determined, connecting to only one of the first device and the second device may include connecting to the first device based on the urgent flag.

In some embodiments, the urgent flag may supersede the priority rating, such as connecting to only one of the first device and the second device based on the connection priority database may include connecting to the one of the first device and the second device which includes the urgent flag in the connection priority database. For example, method 500 may include determining an urgent flag of one of the first device and the second device, and connecting to only one of the first device and the second device may include connecting to the one of the first device and the second device of which the urgent flag was determined. In such embodiments, the urgent flag may have an expiration time. For example, when the second device has a higher priority rating than the first device but the first device is connected based on the urgent flag, method 500 may further include disconnecting the first device and connecting to the second device after the expiration time of the urgent flag.

In cases where the first device and the second device are in the same tier, method 500 may further include comparing a first signal strength of the first device and a second signal strength of the second device. Such comparison may be used to determine which one of the first device and the second device has a stronger signal, and, in such embodiments, connecting to only one of the first device and the second device may include connecting to the one of the first device and the second device with the stronger signal. The device with the stronger signal may be the device which is closer to the household appliance, and thus may be more likely to be in use or soon to be in use. For example, referring again to the cooktop appliance example, the device with the stronger signal may be one of the first probe device 1002, the second probe device 1004, and the smart utensil device 1006. For example, the smart utensil device 1006 may have the stronger signal when the smart utensil device 1006 is placed on the cooktop of the cooktop appliance 100 whereas other devices, such as the first probe device 1002 may be away from the cooktop appliance 100, e.g., stored in a drawer or cabinet, and thus not in use and not prioritized for connection to the cooktop appliance 100. The stronger signal strength may be used to prioritize devices of the same tier or priority rating, devices which each have an urgent flag, or both. Additionally, prioritizing the device with the stronger signal may also prioritize the device which will provide the most stable and reliable connection.

Methods of prioritizing devices for connection may provide numerous advantages. For example, operation of the cooktop appliance may be improved by such methods, e.g., more efficient, reliable, and responsive connection to useful accessories may be provided, thereby improving operation of the appliance. For example, the cooktop appliance may have an improved cooking operation in cooking cycles which include connecting to and communicating with a temperature probe or smart utensil, such as the cooktop appliance may more readily and easily establish and maintain a connection with the appropriate device for a selected cycle. Such methods may be particularly advantageous, for example, when the household appliance has limited resources and supports a limited number of connections. For example, when the communications module includes a shared chipset or dual-radio chipset, the household appliance, and in particular the communication module thereof, may have the same or overlapping bandwidth ranges for multiple types of connections, such as both BLUETOOTH® and WI-FI® connections, and in such embodiments prioritizing connections between multiple devices may provide the most efficient usage of the limited bandwidth available.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a cooking appliance, the cooking appliance comprising a controller and a communication module, the method comprising:

receiving a connection request from a first device;

receiving a connection request from a second device;

looking up a connection priority database, wherein the connection priority database includes a plurality of tiers with at least one device in each tier;

determining an urgent flag of the first device;

confirming a special cooking mode of the cooking appliance corresponding to the first device is activated; and connecting to only the first device based on the connection priority database, the urgent flag, and the special cooking mode.

2. The method of claim 1, wherein each tier of the plurality of tiers includes a priority rating, further comprising determining a first tier of the first device in the connection priority database, and determining a second tier of the second device in the connection priority database.

3. The method of claim 2, wherein the urgent flag has an expiration time, wherein the second tier of the second device has a higher priority rating than the first tier of the first device, further comprising disconnecting the first device and connecting to the second device after the expiration time.

4. The method of claim 3, wherein the second device is a remote user interface device.

5. The method of claim 1, wherein each tier of the plurality of tiers includes a service or feature provided by the at least one device in the respective tier.

6. The method of claim 1, wherein the connection request from the first device is a first short-range radio connection request and the connection request from the second device is a second short-range radio connection request.

7. The method of claim 1, wherein the communication module is a dual-radio chipset.

8. A cooking appliance, comprising:

a communication module; and a controller, wherein the controller is configured for:

receiving a connection request from a first device;

receiving a connection request from a second device;

looking up a connection priority database, wherein the connection priority database includes a plurality of tiers with at least one device in each tier;

determining an urgent flag of the first device;

confirming a special cooking mode of the cooking appliance corresponding to the first device is activated; and connecting to only the first device based on the connection priority database, the urgent flag, and the special cooking mode.

9. The household appliance of claim 8, wherein each tier of the plurality of tiers includes a priority rating, wherein the controller is further configured for determining a first tier of the first device in the connection priority database, and determining a second tier of the second device in the connection priority database.

10. The household appliance of claim 9, wherein the urgent flag has an expiration time, wherein the second tier of the second device has a higher priority rating than the first tier of the first device, further comprising disconnecting the first device and connecting to the second device after the expiration time.

11. The household appliance of claim 10, wherein the second device is a remote user interface device.

12. The household appliance of claim 8, wherein each tier of the plurality of tiers includes a service or feature provided by the at least one device in the respective tier.

13. The household appliance of claim 8, wherein the connection request from the first device is a first short-range radio connection request and the connection request from the second device is a second short-range radio connection request.

14. The household appliance of claim 8, wherein the communication module is a dual-radio chipset.

* * * * *